United States Patent [19]
Teter et al.

[11] Patent Number: 5,981,094
[45] Date of Patent: Nov. 9, 1999

[54] LOW COMPRESSIBILITY CARBON NITRIDES

[75] Inventors: David M. Teter; Russell J. Hemley, both of Washington, D.C.

[73] Assignee: The Carnegie Institution of Washington, Washington, D.C.

[21] Appl. No.: 08/768,891

[22] Filed: Dec. 17, 1996

Related U.S. Application Data

[60] Provisional application No. 60/009,680, Jan. 4, 1996.
[51] Int. Cl.[6] .............................. B32B 9/00; C23C 14/06
[52] U.S. Cl. ..................... 428/698; 428/408; 427/249; 427/581
[58] Field of Search .................................. 428/698, 408; 427/249, 581

[56] References Cited

U.S. PATENT DOCUMENTS

| | | |
|---|---|---|
| 4,003,764 | 1/1977 | Wünning ................................ 148/16.5 |
| 5,110,679 | 5/1992 | Haller et al. ............................ 428/408 |
| 5,573,864 | 11/1996 | Kreider .................................... 428/698 |
| 5,580,429 | 12/1996 | Chau et al. ........................ 204/192.38 |
| 5,593,234 | 1/1997 | Liston ..................................... 428/698 |
| 5,606,056 | 2/1997 | Kouvetakis et al. .................... 428/698 |

*Primary Examiner*—Archene Turner
*Attorney, Agent, or Firm*—Pillsbury Madison & Sutro LLP

[57] ABSTRACT

A cubic form of $C_3N_4$ with a zero-pressure bulk modulus exceeding that of diamond. The product is prepared by combining carbon and nitrogen at a pressure of 120,000 to 800,000 atmosphere and a temperature of 1000–3000° C.

5 Claims, 4 Drawing Sheets

CUBIC–$C_3N_4$

B-$C_3N_4$

α-$C_3N_4$

GRAPHITIC–$C_3N_4$

PSEUDOCUBIC–$C_3N_4$

CUBIC-C$_3$N$_4$

LOW COMPRESSIBILITY CARBON NITRIDES

This Application claims benefit of Provisional application No. 60/009,680 Jan. 4, 1996.

FIELD OF THE INVENTION

The present invention relates to superhard or low compressibility carbon nitrides.

The invention is based on first-principles calculations of the relative stability structure, and physical properties of carbon nitride polymorphs which indicate a cubic form of $C_3N_4$ with a zero-pressure bulk modulus exceeding that of diamond. Like diamond, this new phase may be synthesized at high pressure, and quenched to ambient pressure for use as a low-compressibility material. However, studies indicate that the present cubic form of carbide nitride $C_3N_4$ should be significantly less compressible than diamond at room conditions. Inasmuch as low compressibility is correlated with hardness, the present new material is considered to be harder than diamond and, therefore, of significant technological use as a superabrasive composition and for wear-resistant coatings.

The present invention is the result of extensive interest in the possibility of finding new low-compressibility materials. Various forms of carbon nitrides have previously been proposed as possible superhard materials potentially exceeding diamond in hardness. Several favorable candidate $C_3N_4$ prototype forms have been identified and their energetics, structures and physical properties calculated with the determination that the cubic-$C_3N_4$ form is the most incompressible.

The present cubic-$C_3N_4$ material can be synthesized at pressures and temperatures attainable in the laboratory. Broadly speaking, it is considered that the material can be formed at high pressure and temperature (e.g. 120,000–800,000 atmospheres and 1000–3000° C.), and then quenched stably to ambient conditions.

BACKGROUND OF THE INVENTION

Intense theoretical and experimental interest has been focused on the possibility of new low-compressibility materials with bulk moduli and hardness exceeding that of diamond. Carbon nitrides have been proposed as superhard materials on the basis of empirical systematics [1]. First-principles calculations have suggested that a hypothetical material, $\beta$-$C_3N_4$ may have a bulk modulus somewhat lower than that of diamond [2,3]. These results have motivated theoretical calculations [4-8] and experimental efforts to synthesize and characterize this compound [10–20]. Amorphous C—N films have been synthesized [14,16,20] and small crystallites have been found in some of these films [15,17–19]. Electron diffraction patterns of these crystallites were indexed as the $\beta$-$C_3N_4$ structure. It has also been suggested that a better fit is to phases of graphite [9]. Other forms of carbon nitride with high hardness have been suggested including a fullerene-like carbon nitride [21] and a crystalline carbon nitride composite [22].

DETAILED DESCRIPTION OF THE INVENTION

The present invention is based on an investigation of the stability and properties of carbon nitrides using first-principles calculations. This investigation shows that $\alpha$-$C_3N_4$ and graphite-$C_3N_4$ are energetically preferred over $\beta$-$C_3N_4$ and indicates that a cubic form of $C_3N_4$ has a zero-pressure bulk modulus exceeding that of diamond and is metastable at zero pressure.

Assuming that a low-energy carbon nitride structure with a high bulk modulus must have carbon four-coordinated with nitrogen, and nitrogen three-coordinated with carbon, several additional prototype structures have been identified by considering chemical systems with this type of bonding topology, and locating dense structures within these systems. Using first-principles pseudopotential total energy techniques [23], a series of $C_3N_4$ polymorphs have been examined to determine their energetics, structure and physical properties including zero-pressure bulk modulus ($K_0$), density and band gap.

Calculations, like those in early studies of carbon nitride [4–7], were carried out using density-functional techniques within the local density approximation (LDA) to electron exchange and correlation. A preconditioned conjugate-gradient method was used to minimize the electronic degrees of freedom. The electronic wave functions were expanded in a plane-wave basis set with periodic boundary conditions. Extended norm-conserving and hardness-conserving (ENHC) pseudopotentials [24] were also used. This scheme ensures that the total energies of the atom and pseudoatom match to second order with respect to arbitrary changes in valence state occupancy. This additional condition has been shown to improve pseudopotential transferability in the studies of diamond-carbon [24], silica [25], and the linear response properties of free atoms [26]. For each structure, the total energy over a wide range of volumes was calculated. At a given volume, the positions of the cations and the anions were determined by minimizing the forces on the ions, and the unit cell edges were determined by minimizing the stress on the cell. The resulting energies were fit to a Birch equation of state [27] to calculate the pressure, $K_o$ and pressure derivative of the bulk modulus ($K'_o$).

The $\beta$-$C_3N_4$ structure is based upon the $\beta$-$Si_3N_4$ structure, with C substituted for Si. This structure is similar to the phenacite ($Be_2SiO_4$) structure and consists of fourfold coordinated carbon linked by threefold coordinated N atoms into a network of 3-, 4- and 6-fold rings of $CN_4$ tetrahedra (FIG. 1a). The unit cell contains 14 atoms and has P3 symmetry. The $\alpha$-$C_3N_4$ structure can be described as an ABAB . . . stacking sequence of layers of $\beta$-$C_3N_4$ (A) and its mirror image (B). The unit cell contains 28 atoms and has $P3_1c$ symmetry (FIG. 1b). When the symmetry of the optimized $P3_1c$ structure was relaxed to P3, there were no changes in the atomic coordinates of the structure. The graphitic form of carbon nitride consists of an ABAB . . . stacking of the planar structure [28] (FIG. 1c). The unit cell contains 14 atoms and exhibits $P\bar{6}m2$ symmetry.

Another candidate suggested by this analysis is the pseudocubic $\alpha$-$CdIn_2Se_4$ structure [31] (FIG. 1d). This structure can be classified as a defect-zincblende structure type, a structure-type previously predicted for $C_3N_4$ by Liu et al [6]. It exhibits $P\bar{4}2m$ symmetry and contains seven atoms in the unit cell.

A search for possible candidate structures was also made in the $Zn_2SiO_4$ system, because the zero-pressure willemite-I structure is isomorphous with that of phenacite. In a study of high-pressure transformations in zinc silicates, Syono et al found that the willemite-I structure transforms to the willemite-II structure at 3 GPa at 1400° C. and can be quenched to ambient conditions [29]. The willemite-II structure exhibits $I\bar{4}2d$ symmetry and has 28 atoms in the unit cell. The cubic-$C_3N_4$ studied in connection with the present work is based on the high-pressure willemite-II structure [30] of $Zn_2SiO_4$. When C was substituted for Zn and Si, and N was substituted for O, it was found that this structure adopts cubic I43m symmetry when the structure is allowed to relax (FIG. 1e).

All of the tetrahedrally coordinated structures exhibit similar C—N bond lengths, intertetrahedral C—N—C and intratetrahedral N—C—N bond angles (Table 1). As shown in FIG. 2, $\alpha$-$C_3N_4$ is predicted to have a lower energy than $\beta$-$C_3N_4$ at all volumes. It has also been found that diffraction data [15,17,18] can be reindexed as $\alpha$-$C_3N_4$ with lower rms error. This result agrees with earlier work by Guo and Goddard [8] using interatomic potentials.

As shown in FIG. 2, the graphite-$C_3N_4$ structure is predicted to have a slightly lower energy than $\alpha$-$C_3N_4$. This result agrees qualitatively with earlier calculations comparing the energetics of planar-$C_3N_4$ to those of $\beta$-$C_3N_4$ [6,7]. This structure should be a good candidate precursor for the high pressure synthesis of $C_3N_4$ compounds.

The zero pressure cubic-$C_3N_4$ structure is higher in energy than both $\alpha$- and $\beta$-$C_3N_4$, but became the energetically favorable structure as the volumes were decreased. The transition pressure from $\alpha$- to cubic-$C_3N_4$ is predicted to be approximately 68 GPa. The predicted transition pressure from graphite $C_3N_4$ to cubic-$C_3N_4$ is approximately 12 GPa, which can be easily attained using large volume presses.

For the cubic-$C_3N_4$ structure, the calculated zero-pressure bulk modulus, $K_o$ is 496 GPa. This is greater than the experimental $K_o$ of diamond, i.e. 442 GPa [32]. These results suggest that cubic-$C_3N_4$ may also exhibit high hardness [33]. In order to assess the mechanical stability of cubic-$C_3N_4$, the internal coordinates were displaced at a variety of volumes. The atoms returned to their initial positions following energy minimization under P1 symmetry. Hence, the structure is predicted to be mechanically stable at high pressures as well as at ambient pressures. The elastic constants of cubic-$C_3N_4$ were also determined using established first-principles techniques [34]. The structure meets the Born stability criteria for mechanical stability [35].

The widespread interest in carbon nitrides also arises from their predicted wide band gap and high atomic density. The calculated high-pressure cubic-$C_3N_4$ phase is predicted to have a band gap of 2.90 eV, $\alpha$-$C_3N_4$ has a band gap of 3.85 eV, and $\beta$-$C_3N_4$ has a band gap of 3.25 eV. In all cases, the gap is found to be indirect. Because LDA usually underestimates the experimental band gap by 15–20%, the actual band gaps of the synthesized carbon nitride structures should be higher. All of these phases except graphite-$C_3N_4$ had predicted atomic densities approaching that of diamond (experimental result: 0.2950 mol-atoms/cm$^3$, LDA result: 0.3007 mol-atoms/cm$^3$). It has been found that the atomic density of cubic-$C_3N_4$ is 0.2957 mol-atoms/cm$^3$.

On the basis of its high atomic density and bonding topology of this structure, it is considered that cubic-$C_3N_4$ should be an excellent thermal conductor. Most experimental studies of carbon nitrides have been carried out at ambient or low-pressure conditions. The present results indicate the importance of high-pressure synthesis in the search for new carbon nitrides. The calculated transition pressure to the cubic-$C_3N_4$ phase from low-pressure phases (graphite-$C_3N_4$ or $\alpha$ $C_3N_4$) is within reach of modern high-pressure techniques. Moreover, the predicted transition pressure for synthesis of cubic-$C_3N_4$ from the graphite $C_3N_4$ phase is within the reach of large volume presses, which would allow synthesis at an industrial scale. The present results indicate that it may also be possible to synthesize other high-pressure carbon nitrides with high bulk moduli and low-compressibility character (for example, pseudocubic-$C_3N_4$) as pressure quenchable metastable phases.

BRIEF DESCRIPTION OF THE DRAWINGS

Of the accompanying drawings.

Figure 1A:
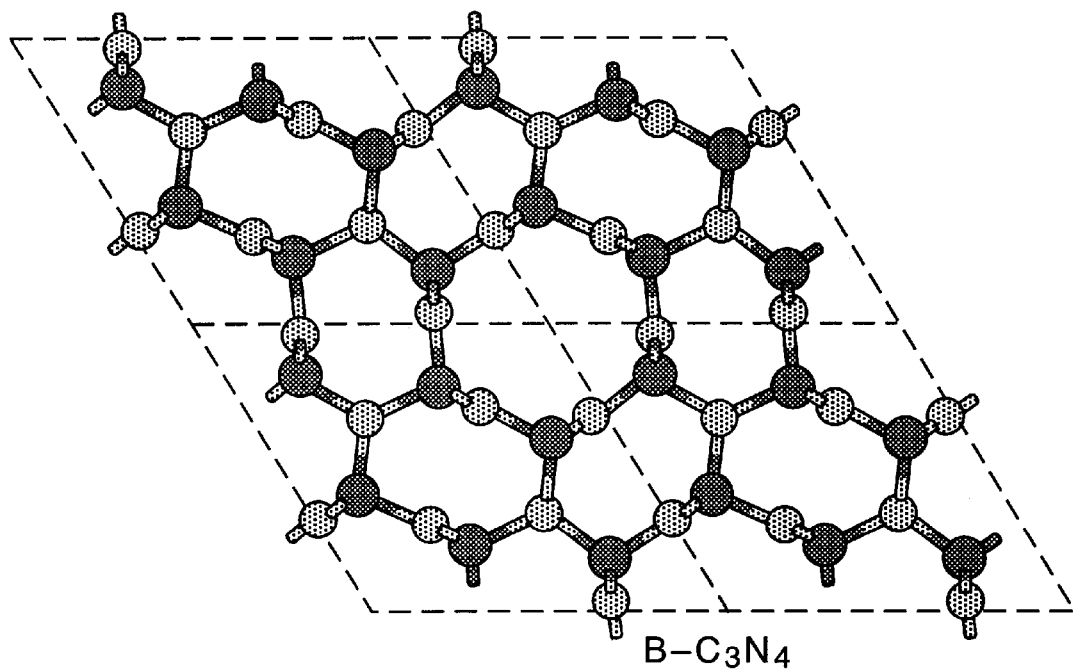
FIG. 1 is a representation of the 62 -$C_3N_4$ (FIG. 1a), $\alpha$-$C_3N_4$ (FIG. 1b), graphite-$C_3N_4$ (FIG. 1c), pseudocubic-$C_3N_4$ (FIG. 1d) and cubic-$C_3N_4$ (FIG. 1e) structures down the [001] axis. The darker spheres represent carbon and the lighter ones stand for nitrogen.
Figure 1B:
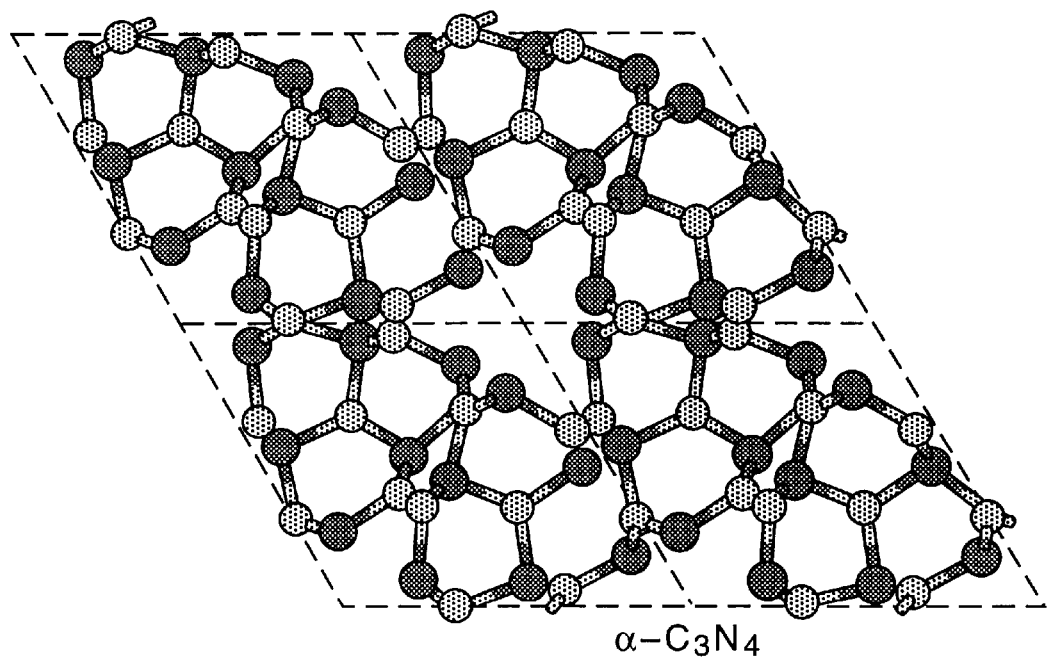
Figure 1C:
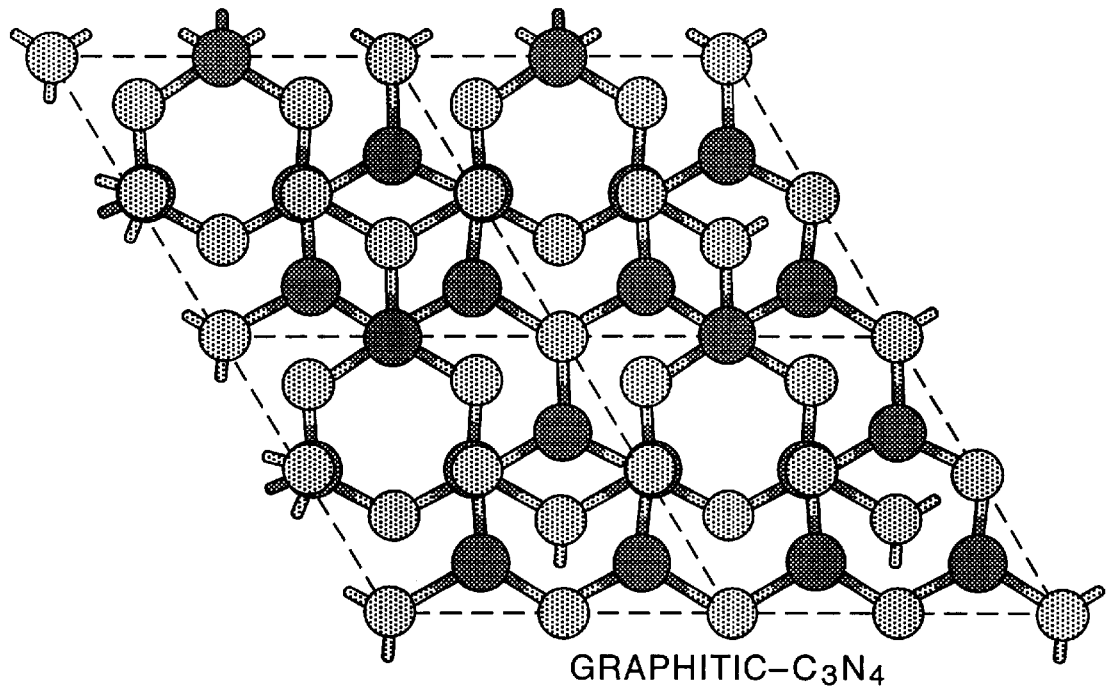
Figure 1D:
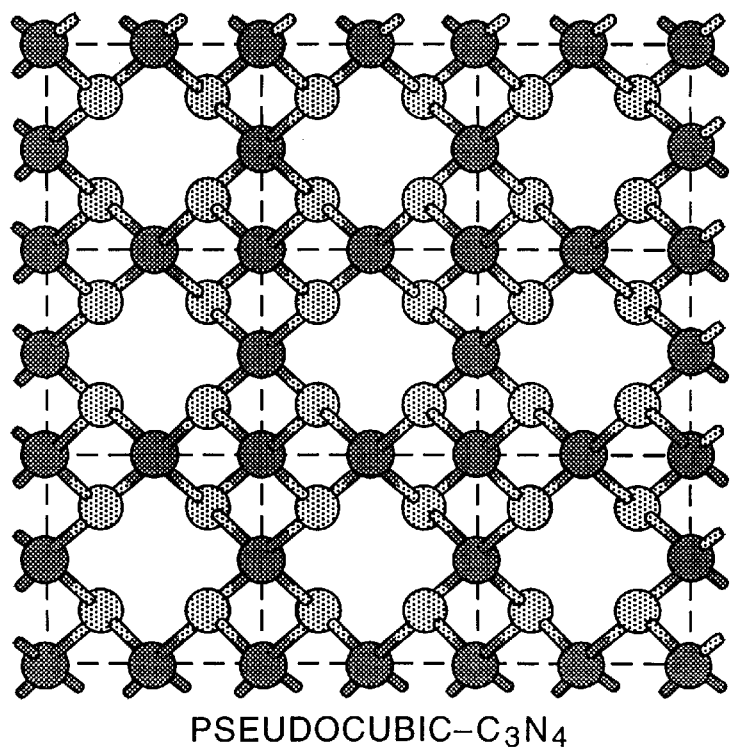

It will be appreciated from the above that the $C_3N_4$ product of the invention is prepared by combining carbon and nitrogen at superatmospheric pressures, e.g. 120,000–800,000 atmospheres (12 GPa to 80 GPa) at, for example, 1000–3000° C. As a typical process, carbon or graphite particles can be immersed in a sea of liquid nitrogen using a diamond-anvil cell. A laser beam is fed into the cell. This heats the particles and brings about combination with nitrogen. The $C_3N_4$ product is then quenched to ambient temperature (20–25° C.) by withdrawing the laser beam.

The table hereafter shows equilibrium structural parameters, bulk moduli and total energies calculated for $\alpha$-$C_3N_4$, $\beta$-$C_3N_4$, cubic-$C_3N_4$, pseudocubic-$C_3N_4$ and graphite-$C_3N_4$. The differences in total energies are converged to below 0.008 eV per $C_3N_4$ unit with respect to k-point integration and kinetic energy cutoff. These calculations were completed at a kinetic energy cutoff at 60 Hartrees. The structural parameters were considered to be fully relaxed when the forces on the ions were less than 0.02 eV/Å and all Pulay-corrected stress tensor components were less than 0.022 eV/Å$^3$.

|  | $\alpha$-$C_3N_4$ | $\beta C_3N_4$ | cubic-$C_3N_4$ | pseudocubic-$C_3N_4$ | graphitic-$C_3N_4$ |
|---|---|---|---|---|---|
| Space Group | P3$_1$c (159) | P3 (143) | I43d (220) | P42m (111) | P6m2 (187) |
| Z | 4 | 2 | 4 | 1 | 2 |
| a (Å) | 6.4665 | 6.4017 | 5.3973 | 3.4232 | 4.7420 |
| c (Å) | 4.7097 | 2.4041 |  |  | 6.7205 |
| C1 | (.5171, .0813, .2102) | (.7732, .1784, .2499) | (.8750, .0000, .2500) | (.0000, .0000, .0000) | (.3517, .1759, .0000) |

-continued

|  | $\alpha$-$C_3N_4$ | $\beta C_3N_4$ | cubic-$C_3N_4$ | pseudocubic-$C_3N_4$ | graphitic-$C_3N_4$ |
|---|---|---|---|---|---|
| C2 | (.1656, .2547, .9905) | (.2271, .8216, .7501) |  | (.5000, .0000, .5000) | (.0197, .5099, .5000) |
| N1 | (.0000, .0000, .0000) | (.3333, .6667, .7500) | (.2812, .2812, .2812) | (.2454, .2454, .2547) | (.0000, .0000, .0000) |
| N2 | (.3333, .6667, .6278) | (.6667, .3333, .2500) |  |  | (.6667, .3333, .5000) |
| N3 | (.3471, .9510, .9706) | (.0331, .3309, .2502) |  |  | (.1694, .3387, .5000) |
| N4 | (.3148, .3188, .2423) | (.9669, .6705, .7498) |  |  | (.5026, .4974, .0000) |
| $\rho_{n,0}$ (atom-mol/cm$^3$) | 0.2726 | 0.2724 | 0.2957 | 0.2897 | 0.1776 |
| $K_0$ (GPa) | 425 | 451 | 496 | 448 | — |
| $K_0'$ | 3.1 | 3.3 | 3.4 | 3.4 | — |
| $E_{tot}$ (eV./$C_3N_4$ unit) | −1598.669 | −1598.403 | −1597.358 | −1597.225 | −1598.710 |

References

[1] M. L. Cohen, *Phys. Rev. B,* 32:7988 (1985)

[2] A. Y. Liu and M. L. Cohen, *Science,* 245:841 (1989)

[3] A. Y. Liu and M. L. Cohen, *Phys. Rev. B,* 41:10727 (1990)

[4] J. L. Corkill and M. L. Cohen, *Phys. Rev. B,* 48:17622 (1993)

[5] H. Yao and W. Y. Ching, *Phys. Rev. B,* 50:11231 (1994)

[6] A. Y. Liu and R. M. Wentzocovitch, *Phys. Rev. B,* 50:10362 (1994)

[7] J. Ortega and O. F. Sankey, *Phys. Rev. B,* 51:2624 (1995)

[8] Y. Guo and W. A. Goddard, *Chem. Phys. Lett.,* 237:72 (1995)

[9] J. V. Badding and D. C. Nesting, submitted to *Chem. Mater.*

[10] T. Sekine, H. Kanda, Y. Bando, M. Yokohama and K. Hojou, *J. Mat. Sci. Lett.,* 9:1376 (1990)

[11] L. Maya, D. R. Cole and E. W. Hagaman, *J. Am. Ceram. Soc.,* 74:1686 (1991)

[12] M. Wixom, *J. Am. Ceram. Soc.,* 73:1973 (1990)

[13] J. J. Cuomo, P. A. Leary, D. Yu, W. Reuter and M. Frisch, *J. Vac. Sci. Technol.,* 16:299 (1976)

[14] H. X. Han and B. J. Feldman, *Solid State Commun.,* 65:921 (1988)

[15] C. Niu, Y. Z. Liu and C. M. Lieber, *Science,* 261:334 (1993)

[16] D. Marton, K. J. Boyd, A. H. Al-Bayati, S. S. Todorov and J. W. Rabalais, *Phys. Rev. Lett.,* 73:118 (1994)

[17] K. M. Yu, M. L. Cohen, E. E. Haller, W. L. Hansen, A. Y. Lu and I. C. Wu, *Phys. Rev. B,* 49:5034 (1994)

[18] J. P. Riviere, D. Texier, J. Delafond, M. Jaouen, E.I. Mathe and J. Chaumont, *Mat. Lett.,* 22:115 (1995)

[19] Z. M. Ren, Y. C. Du, Y. Qiu, J. D. Wu, Z. F. Ying, X. X. Xiong and F. M. Li, *Phys. Rev. B,* 51:5274 (1995)

[20] Y. Yang, K. A. Nelson, F. Adibi, *J. Mater. Res.,* 10:41 (1995)

[21] H. Sjostrom, M. Stafstrom and J. E. Sundgren, *Phys. Rev. Lett.,* 75:1336 (1995)

[22] D. Li, X. Chu, S. Cj, C. Heng, X. W. Lin, V. P. Dravid, Y. W. Chung, M. S. Wong and W. D. Sproul, *Appl. Phys. Lett.,* 67:203 (1995)

[23] M. C. Payne, M. P. Teter, D. C. Allan, T. A. Arias and J. D. Joannopoulos, *Rev. Mod. Phys.,* 64:1045 (1992)

[24] M. P. Teter, *Phys. Rev. B,* 48:5031 (1993)

[25] D. M. Teter, G. V. Gibbs, M. B. Boisen, D. C. Allan and M. P. Teter, *Phys. Rev. B,* In press (1995)

[26] A. Filippetti, D. Vanderbilt, W. Zhong, Y. Cai, and G. B. Bachelet, submitted to *Phys. Rev. B,* (1995)

[27] F. Birch, *J. Geophys. Res.,* 83:1257 (1978)

[28] J. Kouvetakis, A. Bandari, M. Todd, B. Wilkens and N. Cave, *Chem. Mater.,* 6:1376 (1994)

[29] Y. Syono, S. Akimoto and Y. Matsui, *J. Solid State Chem.,* 3:369 (1971)

[30] F. Marumo and Y. Syono, *Acta, Cryst. B,* 27:1868 (1971)

[31] P. P. Lottici, G. Antonioli and C. Razzetti, *J. Chem. Phys. Solids,* 50:967 (1989)

[32] LDA results at the same level of theory and convergence calculate a diamond $K_o$ of 468 GPa. While the predicted bulk moduli of other hypothetical materials, including the high pressure BC-8 carbon structure approach diamond, we find cubic-$C_3N_4$ $K_o$ to exceed diamond.

[33] Although a rigorous correlation between bulk modulus and hardness does not exist, it is found empirically that for an isotropic material hardness is usually proportional to $K_o$ assuming the absence of plsatic deformation. Hence, it is predicted that the hardness of cubic-$C_3N_4$ may exceed that of diamond.

[34] M. J. Mehl, *Phys. Rev. B.* 47:2493 (1993)

[35] The elastic constants of cubic-$C_3N_4$ were determined using norm-conserving Troullier and Martins pseudopotentials at a kinetic energy cutoff of 25 Hartrees with a [444] Monkhoust Pack grid. It was found $c_{11}$=863 GPa, $c_{12}$=313 GPa and $C_{44}$=348 GPa. This meets the Born mechanical stability criteria for a cubic crystal, as $c_{11}$, $c_{11}$−$c_{12}$ and $c_{44}$ are all positive.

[36] Computational results were obtained using a version of the software program Plane-Wave, which is marketed by Biosym Technoloies of San Diego.

Having described the invention, what is claimed as new is:

1. A cubic form of $C_3N_4$ with a zero-pressure bulk modulus exceeding that of diamond.

Figure 1E:
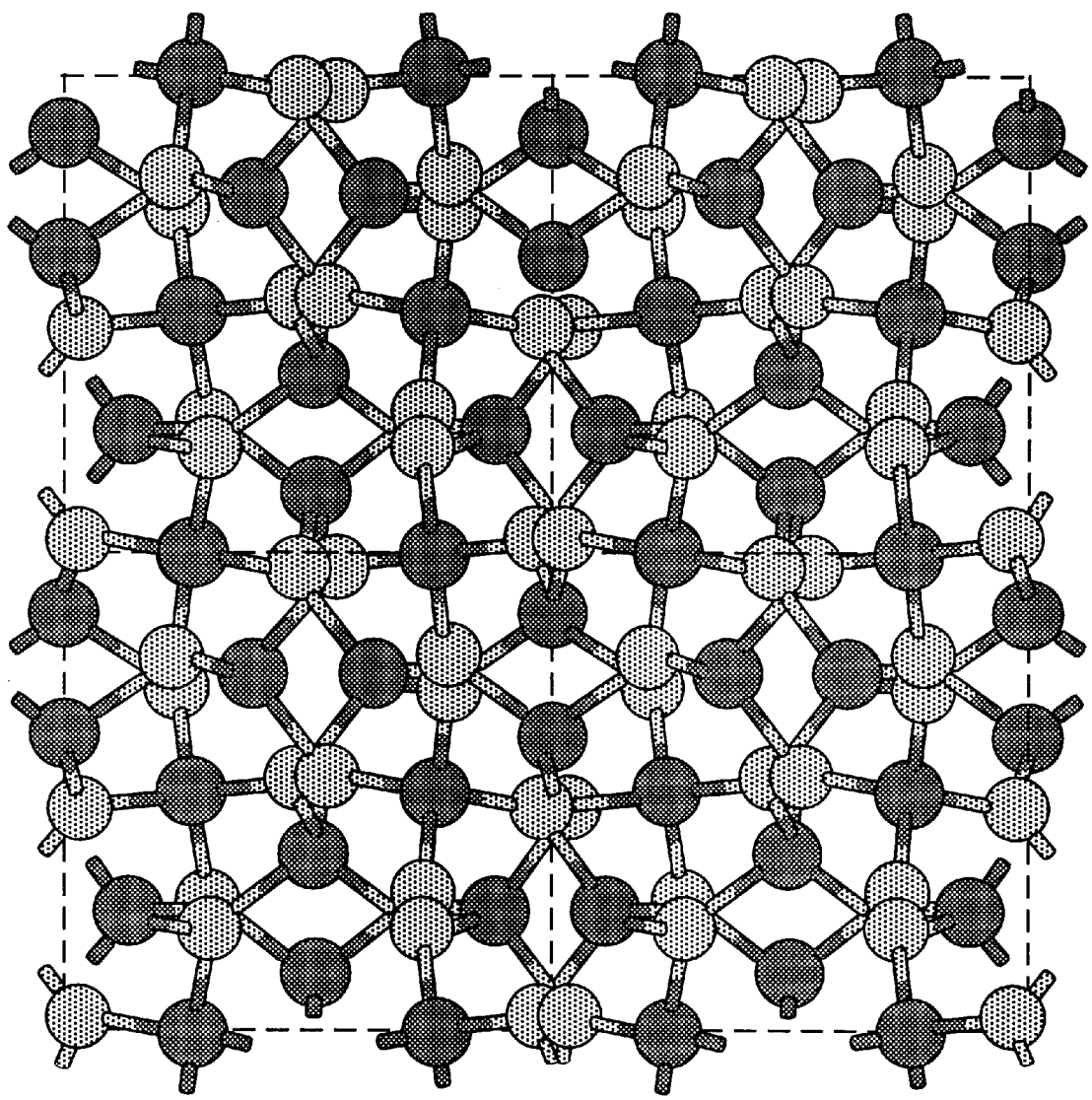
Figure 2:
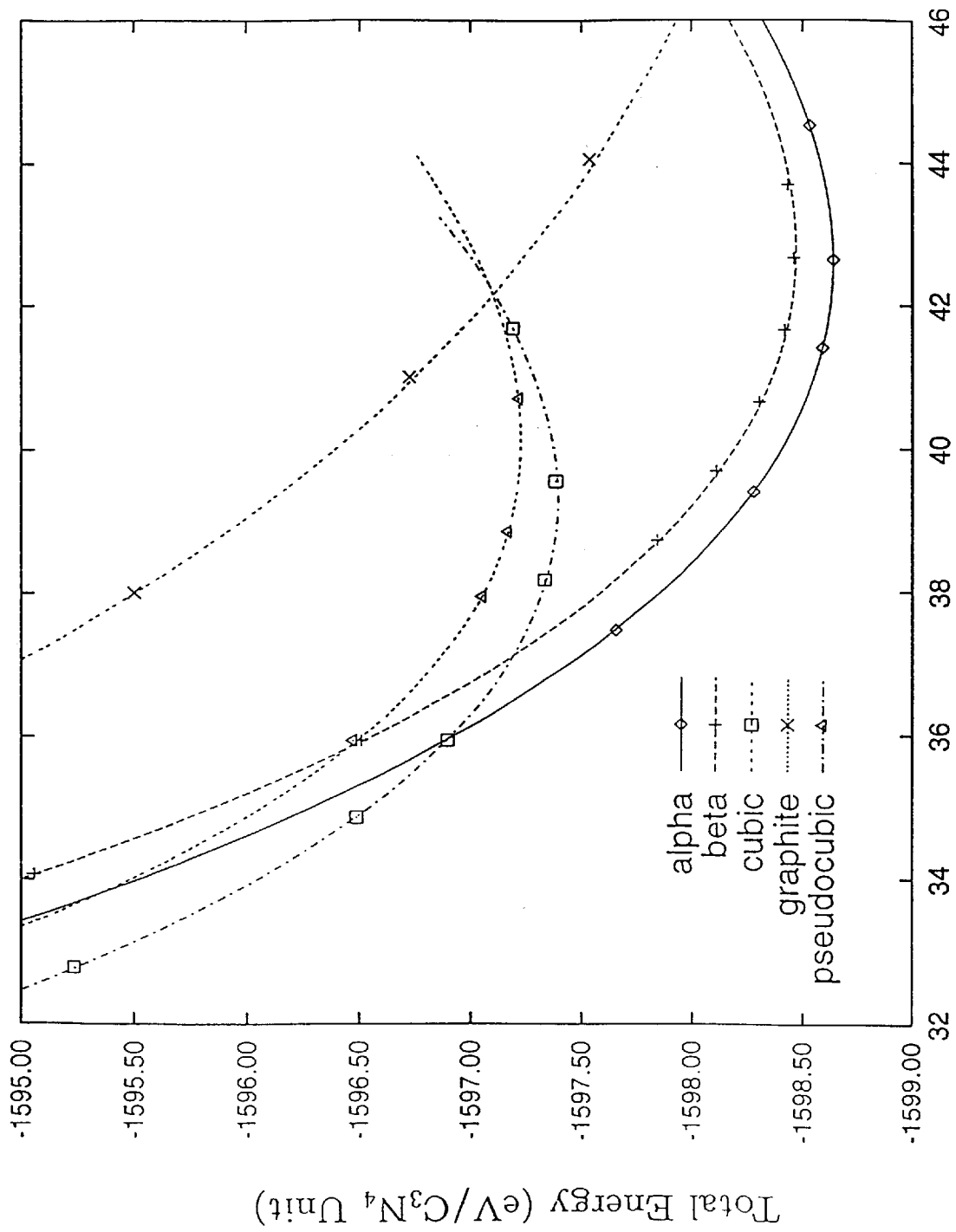
FIG. 2 shows total energies as a function of volume for the structures studied. The curves were generated from fits to the calculated data points using the Birch equation of state. For the $\alpha$-$C_3N_4$ structure, a $K_o$ of 425 GPa is predicted. For the $\beta$-$C_3N_4$ structure, the $K_o$ is 451 GPa and does not change significantly when the symmetry constraints are lowered from P6$_3$/m to P3. The $K_o$ for pseudocubic-$C_3N_4$ structure is also high (448 GPa); although this phase does not appear to be energetically favorable relative to $\alpha$-$C_3N_4$ and cubic-$C_3N_4$, it is conceivable that this material could be formed metastably. Transition pressures are determined by taking common tangents.

2. The product of claim 1 having the structure shown in FIG. 1e.

3. A cubic form of $C_3N_4$ according to claim 1 which is obtained by combining carbon and nitrogen at a pressure of 120,000 to 800,000 atmosphere and a temperature of 1000–3000° C.

4. A process for preparing the product of claim 1 which comprises combining carbon and nitrogen at a pressure of 120,000 to 800,000 atmosphere and a temperature of 1000–3000° C.

5. The process of claim 4 wherein carbon particles are immersed in liquid nitrogen and the mixture is heated by a laser beam followed by quenching.

* * * * *